F. I. AND E. P. DU PONT.
PROCESS OF MAKING SMOKELESS POWDER.
APPLICATION FILED SEPT. 25, 1917.
1,308,346.
Patented July 1, 1919.
2 SHEETS—SHEET 2.
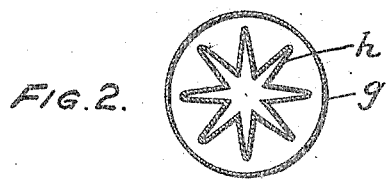
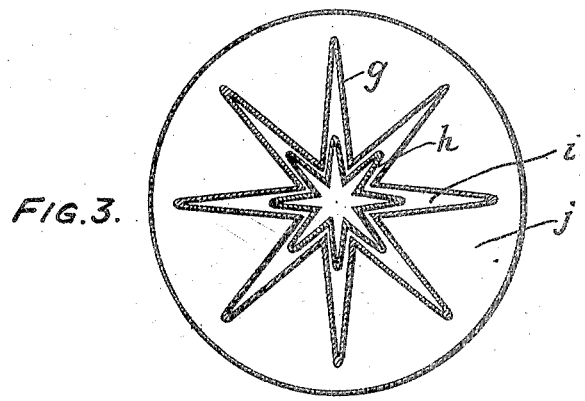
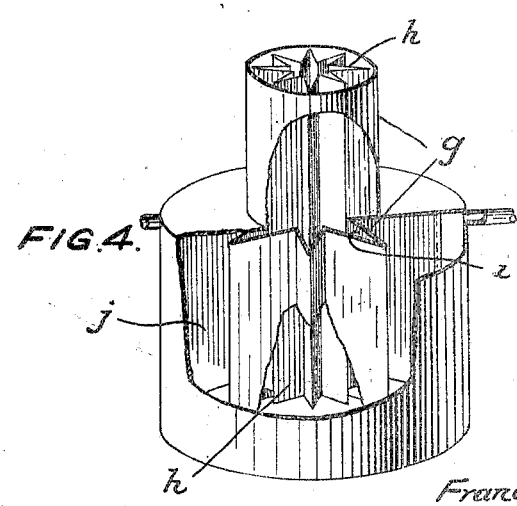
WITNESS:
INVENTORS
Francis I. du Pont and
Eleuthere Paul du Pont
ATTORNEY.

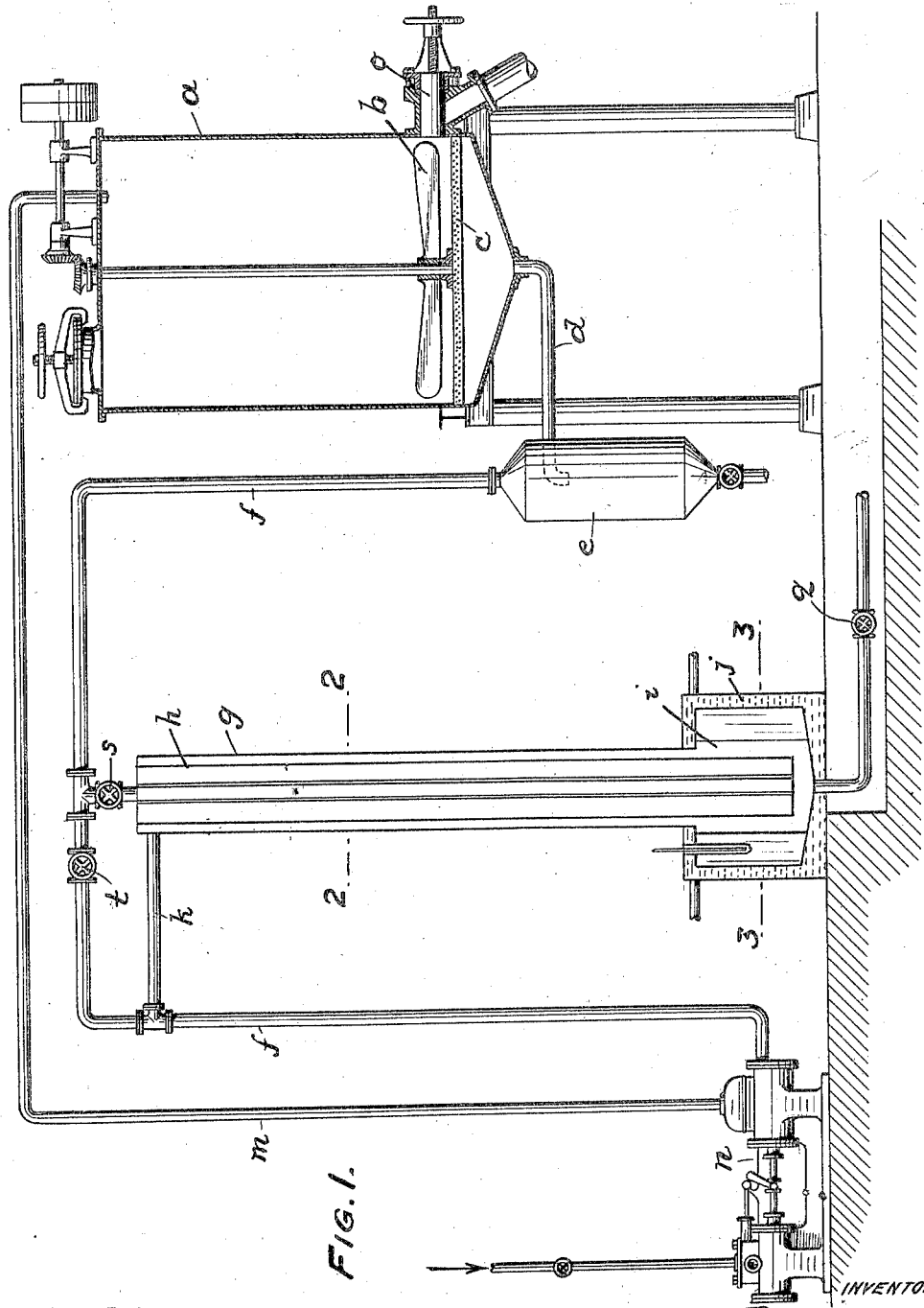

UNITED STATES PATENT OFFICE.

FRANCIS I. du PONT, OF WILMINGTON, AND ELEUTHERE PAUL du PONT, OF MONTCHANIN, DELAWARE, ASSIGNORS TO BALL GRAIN EXPLOSIVES COMPANY, OF WILMINGTON, DELAWARE, A CORPORATION OF DELAWARE.

PROCESS OF MAKING SMOKELESS POWDER.

1,308,346.   Specification of Letters Patent.   Patented July 1, 1919.

Application filed September 25, 1917.   Serial No. 193,106.

*To all whom it may concern:*

Be it known that we, FRANCIS I. du PONT and ELEUTHERE PAUL du PONT, citizens of the United States, residing, respectively, at Wilmington and Montchanin, county of New Castle, and State of Delaware, have invented a new and useful Improvement in Processes of Making Smokeless Powder, of which the following is a full, clear, and exact description, reference being had to the accompanying drawings, which form a part of this specification.

In the manufacture of smokeless powder, after removing the guncotton from the acids and washing it with water to remove the acids and purify it, it is necessary to remove the water, and cause the guncotton to be thoroughly permeated by the solvent, which is a mixture of alcohol and ether. This is usually accomplished by pumping alcohol through the guncotton, thus dissolving out the water, and then adding the necessary quantity of ether.

This process is open to two objections: First, the alcohol is continually weakened and must be continually rectified. Second, the amount of alcohol used in the final mixture is so small that it is necessary to press the guncotton into a very hard cake to reduce the alcohol content to the proper amount. Consequently, it is difficult later to break up this cake in the mixing process.

In our improved process, advantage is taken of a property observed for ether in its relationship to guncotton which is wet with water. It has been observed that when ether is agitated with water-wet guncotton, the guncotton exhibits a slight but decided preference for the ether, so that the ether wets, to a certain extent, the fibers of the guncotton, expelling a large quantity of, though not all, the water.

In addition to this advantage is taken of the solubility of water in ether at ordinary temperatures and the relative insolubility of ice in ether.

In our process, we free the guncotton from water by means of ether instead of by means of alcohol. This is advantageous, because the amount of ether used in the solvent is far greater than the amount of alcohol, and because ether separates from water more readily than does alcohol, thus avoiding rectification.

In carrying out our process we prefer to use the apparatus shown in the accompanying drawings, wherein—

Figure 1 is a diagrammatic general view of the entire apparatus.

Figs. 2 and 3 are sections on the lines 2—2 and 3—3 respectively of Fig. 1.

Fig. 4 is a perspective view, partly broken away, of the part of the apparatus in which the ether is dehydrated.

A tank $a$ is fitted with an agitator $b$ and a filter $c$. Below the filter, a pipe $d$ connects the tank with a separator $e$. A pipe $f$ connects the separator with a pump $n$ and a pipe $m$ connects the pump with the top of the tank $a$.

Extending downward from the elevated central part of pipe $f$ is a tube $h$, which is shaped in cross-section as shown in Fig. 2. The tube $h$ is surrounded by a tubular casing $g$, the lower part of which is enlarged, and shaped as in Fig. 3, to form a chamber $i$. Surrounding the chamber $i$ is a casing forming a jacket $j$. A valve $s$ is placed in tube $h$ near its junction with pipe $f$. A valve $t$ is placed in pipe $f$ just beyond its junction with tube $h$. A pipe $k$ connects the upper part of the casing $g$ with the pipe $f$ beyond the valve $t$.

The guncotton, after washing with water, is conveyed to the tank $a$. With the valve $t$ open and the valve $s$ closed, the pipe $f$, pump $n$ and pipe $m$ provide an endless circulation of ether, which passes downwardly in the tank $a$ through the guncotton, which is subjected to the action of the agitator $b$.

While this circulation is taking place, that part of the process which depends on the preferential wetting tendency of the ether takes place, and the water so separated passes through the filter $c$ and collects in the separator $e$ by virtue of its greater specific gravity.

It has been found that the water content can be reduced to about 15% by this step in the process.

After the circulation has been continued until no more water separates out at $e$, the valve $t$ is closed and the valve $s$ is opened, causing the ether to pass through the ether dehydrator, which comprises the above described tube $h$, casing $g$, chamber $i$ and jacket $j$.

Ether will dissolve at ordinary temperatures a small percentage of water, and we have discovered that it will dissolve hardly any ice; so that when the ether is cooled somewhat below the freezing point of water ice is precipitated out, leaving the ether almost anhydrous and in a condition to dissolve another portion of water.

In the jacket $j$ is circulated cold brine. When the ether passes down the tube $h$ into the refrigerating chamber $i$, the water dissolved in the ether freezes and separates out, remaining in the chamber in the form of ice. The ether leaving chamber $i$ and flowing up within casing $g$ around tube $h$ passes out pipe $k$ into pipe $f$ and thence through the pump $n$ and pipe $m$ and enters the tank $a$ in a dry condition, enabling it to take up considerable water as it passes through the guncotton. This circulation of the ether through the tank and dehydrator is continued until all the water has been removed from the guncotton.

The tube $h$ is made in the deeply corrugated shape shown to present a large surface, the wall of chamber $i$ being similarly shaped for the same purpose. As the ether enters the dehydrator and flows downward inside tube $h$, there is an effective exchange of heat between it and the upwardly moving stream of ether, outside the tube $h$, which has been refrigerated in the chamber $i$. Thus, the downflowing ether has its temperature gradually reduced, while at the same time the upflowing stream is gradually rising in temperature. As the cooler liquid seeks the bottom of any vessel, and as different layers of different temperatures will arrange themselves naturally according to the temperature, the warmer at the top and the colder at the bottom, it will be understood that both the inner and outer tubes ($h$ and $g$) of the dehydrator will be warm at the top and gradually diminish in temperature toward the refrigerating chamber $i$. Thereby a very large quantity of ether may be subjected to extreme cold in the chamber $i$ and yet very little "loss of cold" will occur in the refrigerator, owing to the exchange of heat above. Consequently, a small amount of refrigeration is necessary.

After the complete removal of water from the guncotton, the charge of guncotton and ether in the tank $a$ is drawn off through the valve $o$, after which the charge is ready to be passed to the mixers and to receive the alcohol. A new charge of guncotton is then placed in the tank $a$. The valve $s$ is now closed and the valve $t$ opened, and the circulation of ether directly from the tank $a$ to the pump $n$ and thence to the tank $a$ is restored, effecting the preliminary removal of water from the fresh charge and the separation of the water in the separator $e$.

In the meantime, the brine is cut off from the jacket $j$ and the temperature in chamber $i$ is allowed to rise to a point where the ice is melted, the water being withdrawn through the valve $q$.

Having now fully described our invention, what we claim and desire to protect by Letters Patent is:—

1. In the manufacture of smokeless powder, the process which comprises expelling water from guncotton by means of ether.

2. In the manufacture of smokeless powder, the process which comprises agitating ether with water-wet guncotton, thereby, by reason of the preference of the guncotton for the ether, causing a portion of the ether to wet the fibers of the guncotton and expel a substantial portion of its contained water.

3. In the manufacture of smokeless powder, the process which comprises treating guncotton with acids, washing the treated guncotton with water, eliminating the water from the guncotton by means of ether, and adding alcohol to the ether-wet guncotton.

4. In the manufacture of smokeless powder, the process which comprises establishing an endless circulation of ether, interposing in the circulation guncotton containing water, and in the course of the flow of ether and expelled water away from the guncotton, removing water from the ether.

5. In the manufacture of smokeless powder, the process which comprises expelling water from guncotton by means of ether, then subjecting ether which has passed through the mass of guncotton to a temperature below the freezing point of water, thereby drying the ether, and then passing the thus dried ether through the guncotton to expel additional water therefrom.

6. In the manufacture of smokeless powder, the process which comprises treating with ether a body of guncotton containing water and separating out water until the water content of the guncotton has been substantially reduced, then subjecting ether which has passed through the mass of guncotton to a temperature sufficiently low to substantially eliminate the water therefrom, and treating the guncotton with the thus dried ether to substantially eliminate from the guncotton the remainder of its water content.

7. In the manufacture of smokeless powder, the process which comprises treating with ether a body of guncotton containing water and separating out water until the water content of the guncotton has been substantially reduced, subjecting ether which has passed through the mass of guncotton to a temperature below the freezing point of water, and treating the guncotton with the thus dried ether to substantially eliminate from the guncotton the remainder of the water.

8. In the manufacture of smokeless powder, the process which comprises establishing an endless circulation of ether, interposing in the circulation guncotton containing water and in the course of flow of ether away from the guncotton separately collecting water which has been displaced from the guncotton, continuing the process until, by displacement with ether, the water content of the guncotton has been substantially reduced, then in the course of flow of ether away from the guncotton subjecting the ether to a cooling process to effect a more thorough elimination of water therefrom, and treating the guncotton with the thus dried ether until the remainder of the water is substantially eliminated from the guncotton.

9. In the manufacture of smokeless powder, the process which comprises expelling water from guncotton by means of ether, conveying from the guncotton ether which has passed through the mass of the same and subjecting such ether to a cooling process to separate water therefrom, conveying the thus dried ether to the guncotton to effect further elimination of water from the guncotton, and effecting an exchange of heat between the oppositely flowing streams of ether toward and from the place of cooling.

10. In the manufacture of smokeless powder, the process which comprises expelling water from guncotton by means of ether, subjecting ether which has passed through the mass of guncotton to a cooling process to separate water therefrom, treating the guncotton with the thus dried ether, and causing the streams of ether moving toward and from the place of cooling to flow respectively downwardly and upwardly in heat exchanging relation.

11. In the manufacture of smokeless powder, the process which comprises treating with ether guncotton containing water, collecting by gravity water which is thus expelled from the guncotton, continuing the process until the water content of the guncotton has been substantially reduced, then subjecting ether that has not been absorbed by the guncotton to a refrigerating process adapted to freeze the water and thus dry the ether, and treating the guncotton with the thus dried ether until the water has been substantially eliminated from the guncotton.

12. In the manufacture of smokeless powder, the process which comprises agitating ether with water-wet guncotton, thereby, by reason of the preference of the guncotton for the ether, causing a portion of the ether to wet the fibers of the guncotton and expel a substantial portion of its contained water, and subjecting the solution of water in ether to a sufficiently low temperature to precipitate ice and thereby render the ether approximately anhydrous and using said substantially anhydrous ether to dissolve the remaining water from the guncotton.

In testimony of which invention, we have hereunto set our hands, at Wilmington, Delaware, on this 24th day of September, 1917.

FRANCIS I. du PONT.
ELEUTHERE PAUL du PONT.